United States Patent [19]

Ensinger et al.

[11] 4,408,225
[45] Oct. 4, 1983

[54] SUBSCRIPTION TELEVISION DECODER

[75] Inventors: James W. Ensinger, Roselle; Melvin C. Hendrickson, Elmhurst, both of Ill.

[73] Assignee: Zenith Radio Corporation, Glenview, Ill.

[21] Appl. No.: 280,722

[22] Filed: Jul. 6, 1981

[51] Int. Cl.³ .............................................. H04N 7/16
[52] U.S. Cl. ..................................... 358/120; 358/122
[58] Field of Search ................ 358/120, 124, 122, 123

[56] References Cited

U.S. PATENT DOCUMENTS 4,081,831  3/1978  Tang et al. ......................... 358/120
4,095,258  6/1978  Sperber ............................... 358/120
4,222,068  9/1980  Thompson .

OTHER PUBLICATIONS

RCA Linear Integrated Circuits Application Note ICAN-6802.

Primary Examiner—S. C. Buczinski
Attorney, Agent, or Firm—Jack Kail

[57] ABSTRACT

A decoder is responsive to a decode authorization signal for unscrambling a broadcast RF television signal having randomly suppressed horizontal blanking and synchronization pulses. The decoder comprises a tuner having a gated automatic gain control circuit and a video detector responsive thereto for developing a baseband video signal corresponding to the broadcast television signal. The decoder further comprises a sync restoration circuit developing a standard horizontal synchronization pulse in response to each suppressed horizontal blanking pulse of the baseband video signal, the standard horizontal synchronization pulses being continuously combined with the baseband video signal for operating the automatic gain control circuit and being coupled for unscrambling the baseband video signal only in response to the decode authorization signal.

5 Claims, 1 Drawing Figure

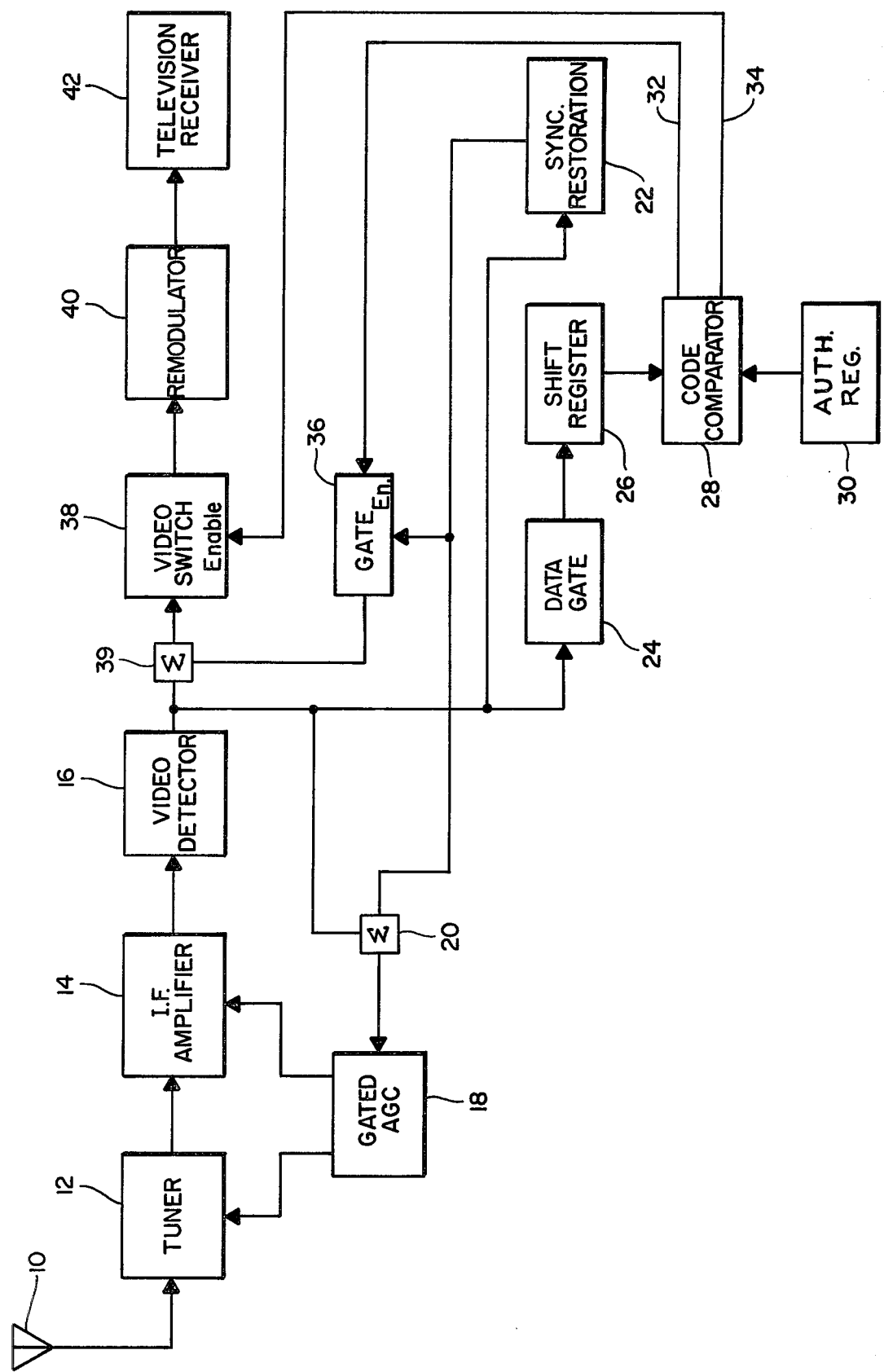

SUBSCRIPTION TELEVISION DECODER

BACKGROUND OF THE INVENTION

The present invention relates generally to improvements in subscription television systems and, more particularly, to improvements in apparatus for unscrambling a broadcast RF television signal having suppressed horizontal blanking and synchronization pulses.

In subscription television systems television programming signals are transmitted, either "over-the-air" or through a suitable cable network, in a scrambled form, which signals may be unscrambled for viewing by a suitable decoder operating the television receiver of an authorized system subscriber. The programming signals may be grouped into several levels or tiers each representing a different programming category such as sporting events, movies, etc., with the decoder of a particular subscriber being authorized for unscrambling the televised programming signals in selected categories, the televised programming signals in the remaining unauthorized categories being coupled to the television receiver in a scrambled and unviewable form. Of course, in such a system, all the programming signals will be reproduced in a scrambled and unviewable form in a normal television receiver.

Horizontal synchronization suppression techniques are commonly used to effect a scrambled broadcast television signal by suppressing the horizontal blanking and synchronization pulses below the average video level of the television signal. This causes the horizontal deflection system of a television receiver to lock on random video peaks during the active or video trace line portion of the video signal rather than on the actual horizontal synchronization pulses. In addition, the ability of the television receiver to use the color reference burst associated with the horizontal synchronization signals is severely degraded thereby causing inaccurate color reproduction. U.S. Pat. No. 4,222,068, to Thompson, teaches a system employing the foregoing techniques wherein an encoder is provided for modifying a broadcast television signal by suppressing the amplitude of randomly selected horizontal blanking and synchronization pulses during the fields of the video signal. Each system subscriber is provided with a decoder whose front end comprises conventional tuning, intermediate frequency and video detection stages. Also, a gated automatic gain control circuit, adapted for responding to the tips of standard NTSC horizontal synchronization pulses, is provided for controlling the gain of the tuning and intermediate frequency stages in accordance with the output of the video detection stage. A sync restoration circuit is operable in response to the suppressed front porch of each suppressed horizontal blanking pulse developed at the output of the video detection stage for producing a standard NTSC horizontal synchronization pulse, which standard horizontal synchronization pulses are continuously coupled to an input of the automatic gain control circuit for insuring proper operation thereof and also continuously inserted in the video signal developed at the output of the video detection stage for achieving an unscrambled video signal. The video signal including the restored horizontal synchronization pulses is impressed on a standard television channel RF carrier by a remodulator and then coupled as an unscrambled RF television signal to the antenna inputs of a television receiver. Each decoder additionally includes a decode authorization circuit storing a unique subscriber code which is compared to a subscriber authorization code transmitted during a horizontal line of the vertical interval of the broadcast television signal. If the stored subscriber code and the transmitted subscriber authorization code results in a favorable comparison, a decode authorization signal is developed enabling the remodulator for coupling the unscrambled signal to the television receiver for viewing, the remodulator otherwise being disabled. The system disclosed in the Thompson patent therefore requires the use of a relay or other relatively expensive switching circuit for selectively enabling and disabling the remodulator. In addition, when the remodulator is disabled in response to the absence of a decode authorization signal, a noisy video image is nevertheless produced on the viewing screen of the television receiver which frequently leads to the annoying situation wherein the viewer mistakenly assumes that the decoder is malfunctioning.

In order to alleviate these and other problems, modifications of the decoder taught in the Thompson patent have been proposed wherein the restored horizontal synchronization pulses are gated for operating the automatic gain control circuit and for insertion in the video signal path for unscrambling the broadcast television signal only in response to the development of a decode authorization signal. These modified decoders also typically include a video switch connected in the video signal path between the video detection stage and the remodulator for selectively controlling the application of the video signal to the input of the remodulator. Thus, when the video switch is operated for establishing the video signal path a scrambled video signal is coupled to the remodulator in the absence of a decode authorization signal and an unscrambled video signal is coupled to the remodulator by gating the restored horizontal synchronization pulses for operating the automatic gain control circuit and for insertion in the video signal path in response to the development of a decode authorization signal. In accordance with this decoding technique, it will be appreciated that during the absence of a decode authorization signal the automatic gain control circuit will not function properly due to the suppressed level of the horizontal synchronization pulses. Moreover, it has been found that upon the development of a decode authorization signal, an extended delay (sometimes of up to several minutes) is encountered before the automatic gain control circuit initiates proper operation in response to the restored horizontal synchronization pulses. As a result, an unacceptable picture is produced on the viewing screen of the television receiver for a time interval even though the subscriber has been authorized to decode the broadcast signal. This condition is quite annoying to the viewer and hence poses an undesirable situation.

It is therefore, a basic object of the present invention to provide an improved decoding apparatus operable for unscrambling a broadcast RF television signal characterized by suppressed horizontal blanking and synchronization pulses.

It is a more specific object to the invention to provide a decoder of the foregoing type wherein the remodulator associated therewith is continuously operable independent of the development of a decode authorization signal and wherein the automatic gain control circuit associated with the tuning stage of the decoder is responsive for immediately assuming a proper operating mode upon the development of a decode authorization signal.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawing in which the sole FIGURE illustrates the decoder of the present invention in block diagram form.

DESCRIPTION OF THE PREFERRED EMBODIMENT

Referring now to the drawing, there is illustrated a subscription television decoder selectively operable for unscrambling a broadcast RF television signal having suppressed horizontal blanking and synchronization pulses. An RF television signal of this type may be derived, for example, from a television signal transmitter as disclosed in the previously mentioned Thompson patent, the transmitter including an encoder adapted for modifying a standard NTSC television signal by suppressing the amplitude of randomly selected horizontal blanking and synchronization pulses during the fields of the video signal. As a result of this signal suppression, the horizontal deflection system of a normal television receiver will lock on random video peaks during the active or video trace line portions of the video signal rather than on the actual horizontal synchronization pulses resulting in the production of a scrambled video image on the viewing screen of the television receiver. In addition, the ability of the television receiver to use the color reference burst associated with the horizontal synchronization signal is severely degraded causing inaccurate color reproduction. The Thompson encoder is additionally adapted for transmitting a subscriber authorization code in serial format during a selected horizontal line of the vertical interval of the broadcast television signal. As will be explained in further detail hereinafter, the present invention contemplates the transmission of a program authorization code adapted for identifying the level or tier of the programming information being transmitted by the accompanying television signal. A subscriber authorization code as taught in Thompson may or may not be transmitted together with the foregoing program authorization code.

Returning now to the drawing, the decoder comprises an antenna 10 adapted for intercepting the broadcast RF television signal, which is usually although not necessarily transmitted in the UHF band, for application to a conventional television receiver tuning stage 12. As is well known in the art, tuning stage 12 converts the received RF television signal to an intermediate frequency signal which is coupled through an intermediate frequency amplifier 14 to the input of a video detector 16. The output of video detector 16 comprises a composite baseband video signal reflecting both the video and synchronization signal components of the broadcast television signal. Thus a standard NTSC composite baseband video signal is developed at the output of video detector 16 except that randomly selected horizontal blanking and synchronization pulses are characterized by suppressed amplitudes. The decoder further comprises a conventional gated automatic gain control circuit 18 of the type responsive to the tips of standard NTSC horizontal synchronization pulses for controlling the gains of tuning and intermediate frequency stages 12 and 14. Automatic gain control circuit 18 may, for example, comprise RCA integrated circuit CA3154G. In the decoder of the invention, the output of video detector 16 is coupled to one input of a summer 20 for operating automatic gain control circuit 18. However, since the amplitudes of random horizontal synchronization pulses developed at the output of video detector 16 are suppressed below the average video level, the automatic gain control circuit will function in an extremely eratic manner. While such eratic behavior of the automatic gain control circuit can be tolerated when the decoder is not being operated in a decode mode, it is desirable that proper operation ensue immediately upon changeover to a decode mode of operation. In accordance with the present invention, the foregoing is accomplished by coupling the output of a sync restoration circuit 22 to a second input of summer 20. Sync restoration circuit 22 is responsive to the output of video detector 16 for sensing the suppressed front porch of each suppressed horizontal blanking pulse for developing a properly timed standard NTSC horizontal synchronization pulse, which restored horizontal synchronization pulses are combined with the composite baseband signal developed at the output of video detector 16 by summer 20. The output of summer 20 therefore comprises a fully restored composite baseband signal adapted for properly operating automatic gain control circuit 18. As a consequence, whether or not the decoder is being operated in a decode mode, standard horizontal synchronization pulses are continuously applied to the input of automatic gain control circuit 18 for insuring proper operation thereof.

The decoder of the invention further comprises a data gate 24 connected to the output of video detector 16 and operable for gating the vertical interval horizontal line containing the transmitted program code to the input of a multibit shift register 26. The program code thereby stored in shift register 26 is applied to one input of a comparator 28 for comparison with a subscriber authorization code stored within a storage element such as register 30. The stored subscriber code comprises an authorization code identifying the levels or tiers of programming the subscriber is authorized to receive. For example, assuming that the system encompasses five different programming categories or tiers, the authorization code would consist of five bits, one for each programming category, with a logical 1 bit indicating that the subscriber is authorized to receive televised programming within the respective category and a logical 0 bit indicating that the subscriber is not authorized to receive the televised programming with the associated category. The program code stored in shift register 26 also comprises five bits each identifying a respective programming category, the bits identifying the currently transmitted programming category being logical 1 and the remaining bits being logical 0. Thus, if comparator 28 detects a match between the logical 1 bit of the transmitted program code stored in shift register 26 and the corresponding bit of the subscriber authorization code stored in register 30, a decode authorization signal is developed on a first output conductor 32 of comparator 28 and a switching control signal is developed on a second output conductor 34 of the comparator. If the stored subscriber authorization code indicates that he is authorized to receive at least one programming category although not the programming category identified by the program code stored in shift register 26, only the switching control signal is developed on conductor 34. If the subscriber is not authorized to receive any of the programming categories, as reflected by the stored authorization code in register 30, then neither a decode authorization signal nor a switching control signal is developed by comparator 28.

The decode authorization signal is coupled by conductor 32 to the enable input of a gate 36, the data input of gate 36 being supplied from the output of sync restoration circuit 22, while the switching control signal is coupled to the enable input of a video switch 38 connected in the video signal path. Thus, if the subscriber is authorized to receive the televised programming both gate 36 and video switch 38 are enabled. The restored horizontal synchronization pulses developed by sync restoration circuit 22 are coupled through gate 36 to one input of a second summer 39 for combination with the composite baseband signal which is coupled from video detector 16 to the second input of summer 39. As a consequence, the output of summer 39 comprises an unscrambled baseband video signal having fully restored horizontal synchronization pulses. The unscrambled video signal is coupled from summer 39 through enabled video switch 38 for application to a continuously operating remodulator 40. Remodulator 40 amplitude modulates the unscrambled composite baseband video signal on a standard NTSC television channel RF carrier, usually channel 3 or 4, for application to the antenna terminals of a normal television receiver 42 which, in turn, produces a corresponding unscrambled video image on its viewing screen.

On the other hand, if comparator 28 only develops a switching control signal on conductor 34 but not a decode authorization signal on conductor 32, then video switch 38 remains enabled but gate 36 is disabled. As a result, the restored horizontal synchronization pulses are not inserted in the video signal path and a scrambled signal is coupled through video switch 38 and remodulator 40 for application to television receiver 42. Finally, if comparator 28 develops neither a switching control signal nor a decode authorization signal both gate 36 and video switch 38 will be disabled. As a result, remodulator 40 is operable for coupling a blanked or black level video signal for producing a blanked image on the viewing screen of television receiver 42.

What has thus been shown is an improved decoder circuit for unscrambling a broadcast RF television signal characterized by suppressed horizontal blanking and synchronization pulses. The decoder is operable for continuously coupling restored horizontal synchronization pulses to the automatic gain control circuit associated with the decoder's tuning stage so long as a scrambled signal is received and is further operable for inserting the restored horizontal synchronization pulses in the video signal path for unscrambling the video signal only in response to a decode authorization signal.

While a particular embodiment of the invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention.

What is claimed is:

1. A decoder for unscrambling a broadcast RF television signal used to transmit one or more levels of programming information, said television signal being characterized by randomly suppressed horizontal blanking and synchronization pulses and including a program code identifying the level of programming information currently being transmitted, said decoder comprising:
   means for receiving and converting said broadcast RF television signal to a corresponding baseband video signal, said receiving and converting means including a gated automatic gain control circuit operable in response to the horizontal synchronization pulses of a standard television signal;
   means storing a subscriber authorization code identifying one or more of said levels of programming information;
   means for developing a decode authorization signal in response to the detection of a predetermined relationship between said stored subscriber authorization code and the program code characterizing said transmitted television signal;
   means developing a standard horizontal synchronization pulse in response to each suppressed horizontal blanking pulse of said baseband video signal; and
   first circuit means for combining said baseband video signal with said standard horizontal synchronization pulses for continuously operating said gated automatic gain control circuit;
   second circuit means operable independently of the first circuit means for combining said baseband video signal with said standard horizontal synchronization pulses for unscrambling said baseband video signal only in response to the development of said decode authorization signal.

2. A decoder according to claim 1 including means for remodulating said unscrambled baseband video signal on a standard television channel RF carrier.

3. A decoder according to claim 1 wherein said first and second circuit means comprise first and second summers respectively.

4. A television signal decoder responsive to a decode authorization signal for unscrambling a broadcast RF television signal having randomly suppressed horizontal blanking and synchronization pulses comprising:
   tuning means for receiving and converting said broadcast RF television signal to a corresponding intermediate frequency signal, said tuning means including a gated automatic gain control circuit operable in response to the horizontal synchronization pulses of a standard television signal;
   detection means responsive to said tuning means for converting said intermediate frequency signal to a corresponding baseband video signal;
   means developing a standard horizontal synchronization pulse in response to each suppressed horizontal blanking pulse of said baseband video signal;
   first summing means responsive to said baseband video signal and to said standard horizontal synchronization pulses for continuously operating said gated automatic gain control circuit; and
   second summing means operable independently of the first summing means and responsive to said baseband video signal and to said standard horizontal synchronization pulses for unscrambling said baseband video signal only in response to said decode authorization signal.

5. A television signal decoder according to claim 4 including means for remodulating said unscrambled baseband video signal on a standard television channel RF carrier.

* * * * *